Dec. 10, 1935.   H. ESSER   2,023,727
MANUFACTURE OF SEAMLESS TUBES
Filed July 18, 1934   3 Sheets-Sheet 1

H. Esser
INVENTOR

By: Marks & Clerk
Attys.

Dec. 10, 1935.  H. ESSER  2,023,727
MANUFACTURE OF SEAMLESS TUBES
Filed July 18, 1934  3 Sheets-Sheet 2
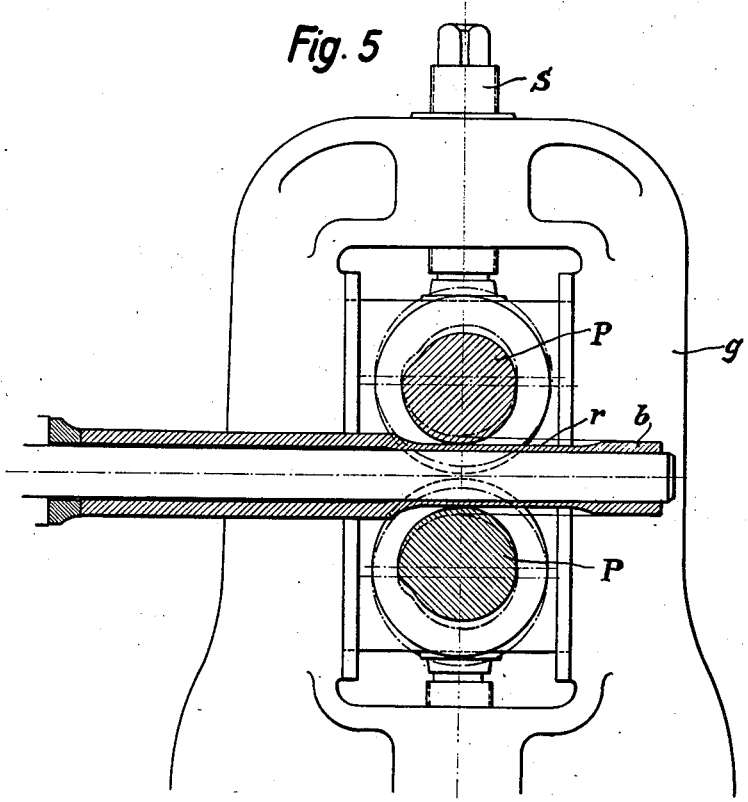
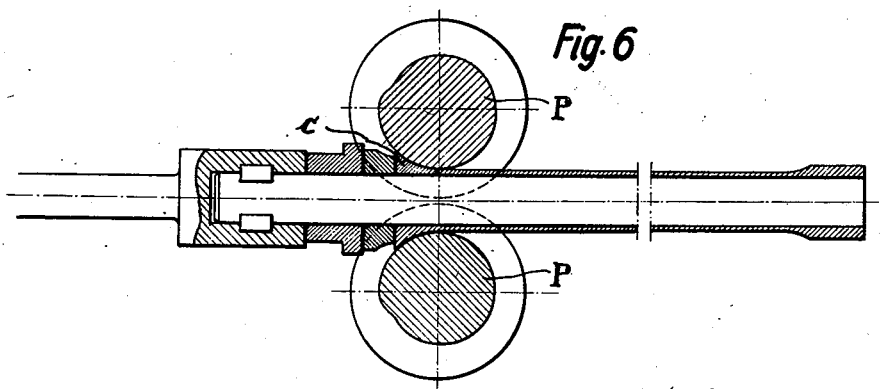
H. Esser
Inventor
By: Glascock, Downing & Seebold
Attys Dec. 10, 1935.   H. ESSER   2,023,727
MANUFACTURE OF SEAMLESS TUBES
Filed July 18, 1934   3 Sheets-Sheet 3

H. Esser
INVENTOR

By Glascock Downing & Seebold Atty.

Patented Dec. 10, 1935

2,023,727

UNITED STATES PATENT OFFICE 2,023,727

MANUFACTURE OF SEAMLESS TUBES

Heinrich Esser, Hilden-Rheinland, Germany

Application July 18, 1934, Serial No. 735,876
In Germany August 7, 1933

2 Claims. (Cl. 29—156)

In pipe lines for water, gas or steam the individual pipes have to be firmly and tightly connected together by suitable joints. Such joints are for instance sleeve joints, screwed joints, flange joints and the like. Through making the joint the pipe line is weakened at the connecting place, so that it is necessary either to make the pipe thicker at the ends or to make the wall of the whole pipe correspondingly thicker.

While in the case of tubes made by the direct rolling process, that is tubes of small or medium diameter, various methods have been developed for already making the thickened ends in the rolling process, this has not hitherto been possible in the case of large tubes made by the subsequent widening of the rolled tubes, as the rolling mill for effecting the widening produces the same wall thickness over the entire length. In the case of sleeve joints the expedient has been adopted to reinforce the sleeve end by a slipped-on piece of tube. In screwed connections, including screwed-on flanges and collars, the thread had to be cut in the tube wall, the effective cross-section of the tube for withstanding the stresses in tension, compression and bending being thus weakened. For obtaining a tube joint capable of withstanding the stresses occurring in operation, the wall thickness would in this case have to be suitably increased over the entire length of the tube. This, however, results in tubes of a weight which is uneconomical.

The present invention relates to a method which makes it possible to provide the tube ends with a thickened wall, even in the case of tubes which have to be subjected to a widening operation after being rolled, and consists in entirely or partially retaining the pilger head at one end of a pilgered tube and rolling out the other tube end thicker and thereupon widening the tube by means of one or more expanding mandrels, which operation may be carried out for instance in the manner described in the (patent application Ser. No. 671,580, filed May 17, 1933). The tube produced in this manner will then have wall thickenings at both ends, which are used for making the correspondingly strengthened tube joints.

In the accompanying drawings several constructional forms of tubes made according to the new method are shown in axial section, in Figs. 1 to 4, Fig. 5 is a part vertical section through a pilger rolling mill showing a tube in the course of being rolled, Fig. 6 is an axial section through the tube shown in Fig. 5 with the pilger rolls in the position they occupy at the end of the rolling operation, Fig. 7 is an axial section through a tube which has been expanded at one end for facilitating the entry of the expanding mandrel, Fig. 8 is an axial section through the tube shown in Fig. 7 with the expanding mandrel drawn partly through it, Fig. 9 is an end elevation of a tube expanding apparatus and Fig. 10 is a longitudinal elevation partly in section of the apparatus shown in Fig. 9.

In Fig. 1 $a$ is a pilgered and widened tube, the end thickenings of which have been effected in accordance with the invention through rolling out the end $b$ of the tube, at which the rolling operation begins, thicker over a certain length by separating the rolls of the pilger rolling mill (not shown) and thereupon approaching the rolls towards one another to such an extent that the intended wall thickness of the tube is obtained. At the other tube end the pilger head $c$ which remains from the pilgering process has been entirely or partially retained and the tube with the pilger head and the opposite end thickening widened to the desired diameter (Fig. 1) by drawing through it one or more expanding mandrels placed one behind another and increasing in diameter, for instance in the manner described in (patent application, Ser. No. 671,580, filed May 17, 1933).

Figure 1:
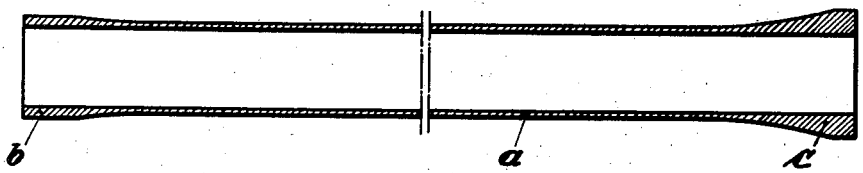
Figure 2:
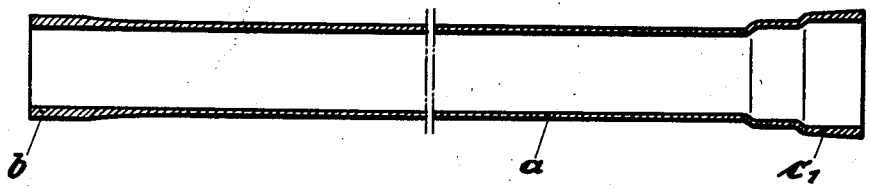
Fig. 2 shows a similar tube, in which a thickened socket $c_1$ has been forced out of the pilger head.
Figure 3:
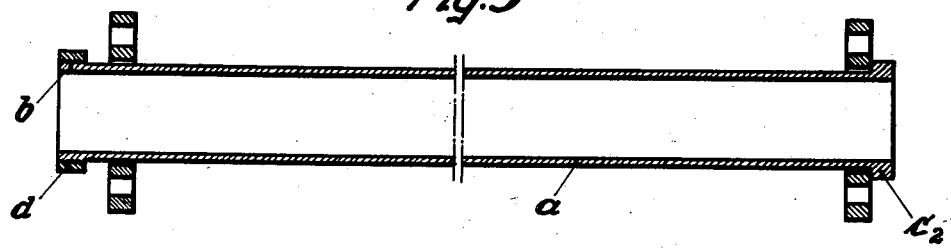
Fig. 3 shows a constructional form, in which a flange $c_2$ has been turned out of the pilger head and at the more thickly rolled out and widened end $b$ a thread has been cut without weakening the tube wall for screwing on a collar $d$.
Figure 4:
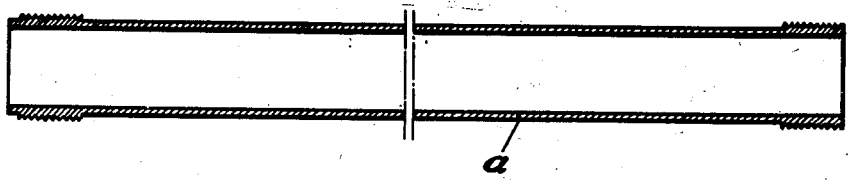

Fig. 4, finally, shows a constructional form, in which there are threaded thickened portions at both ends.

In accordance with the invention the tubes are produced by rolling them on a mandrel $t$ between pilger rolls P (Figs. 5 and 6) which are mounted in roll stands $g$ in bearings which can be moved towards and away from one another by means of screw spindles S. At the commencement of the rolling the rolls P are moved apart into the position shown in dot and dash lines and the thickened end part $b$ is formed, the rolls P being then brought closer together into the position shown in full lines for rolling the part $r$ intermediate of the ends of the tube to the required thickness. At the end of the rolling operation the rolls P occupy the position shown in Fig. 6 in which c is the so-called pilger head.

Figure 7:
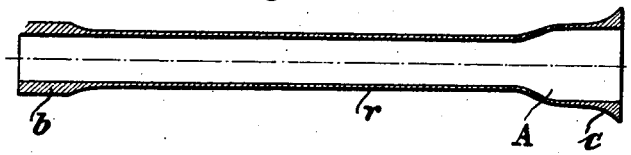
Figure 8:
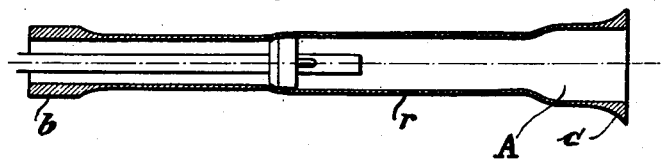
Figure 10:
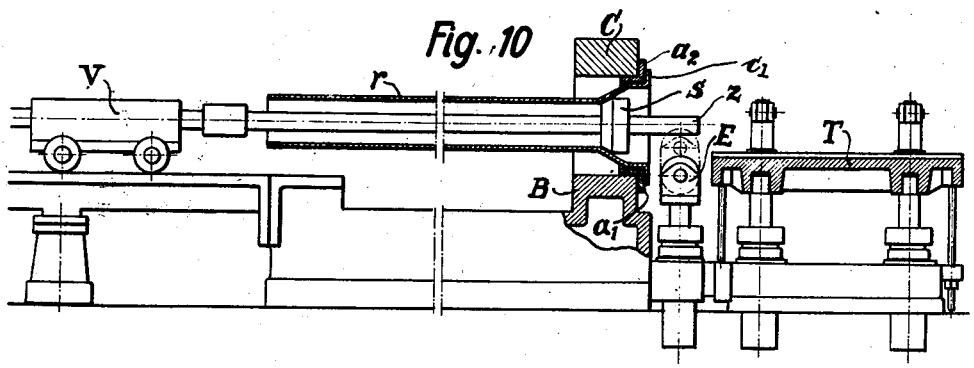
Figure 9:
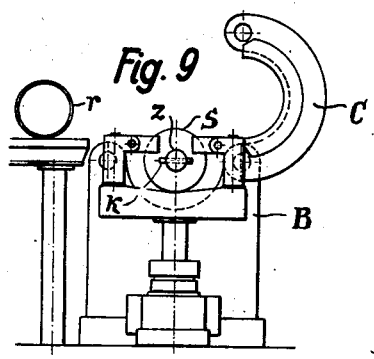

The tube is now expanded at the end where the pilger head is situated as shown in Fig. 7 to a diameter A corresponding to the final diameter of the tube and the tube is then widened throughout its length in a plurality of stages by passing expanding mandrels through it having bosses of progressively increasing diameter. Fig. 8 shows a tube with such a mandrel in the act of widening a tube and Figs. 9 and 10 show the widening apparatus with a mandrel in position ready to be drawn through the tube. In Figs. 9 and 10 $z$ is the mandrel arbor on which an expanding boss $s$ is removably secured by a cotter $k$. B is an abutment which is divided along a horizontal plane on which the axis of the tube lies during the expanding of the tube, the two parts of the abutment being hinged together and being provided with bushes $a_1$, $a_2$ against which a flange $c_1$ on the tube bears. V is a draw carriage and T is a table for supporting the boss $s$ while the mandrel is being introduced into the tube and which is raised or lowered to enable the axis of the mandrel to be brought into coincidence with the tube axis, the end of the mandrel arbor $z$ being supported upon a roller guide E, which can also be raised and lowered, until the boss $s$ has entered the narrower portion of the tube.

The constructional forms which can be made in accordance with the invention are of course not exhausted by the examples illustrated. Every joint, in which a thickening of the tube wall is required, can be made by the new method in a very simple and cheap manner. The new method has the further advantage, that it greatly increases the output of the rolling mill by retaining the pilger head, and furthermore, considerably reduces the manufacturing costs of the joints.

What I claim is:—

1. A method of producing seamless tubes of large diameter having a thickened portion at each end, consisting in pilger rolling the tubes, wholly or partially retaining a pilger head at one end of the tube, rolling out the other end of the tube so as to provide a thickening on it and thereupon widening the tube by passing an expanding mandrel through it so as to expand the thickened end of the tube to the same internal diameter as the main body portion while leaving the initial thickened end of greater thickness than that of the main tube portion.

2. A method of producing seamless tubes of large diameter having a thickened portion at each end, consisting in pilger rolling the tubes, commencing by rolling out the one end along a certain length thereof with the pilger rolls separated so as to provide a thickened portion at that end, continuing the rolling with the rolls approached towards one another to the extent required for giving the tube the required wall thickness, terminating the rolling at a point spaced from the other end so as to retain a pilger head at said end and thereupon widening the tube by passing an expanding mandrel through it so as to expand the thickened end of the tube to the same internal diameter as the main body portion while leaving the initial thickened end of greater thickness than that of the main tube portion.

HEINRICH ESSER.